United States Patent [19]

Saha et al.

[11] Patent Number: 5,106,714
[45] Date of Patent: Apr. 21, 1992

[54] INTERDISPERSED TWO-PHASE FERRITE COMPOSITE AND ELECTROGRAPHIC MAGNETIC CARRIER PARTICLES THEREFROM

[75] Inventors: Bijay S. Saha; Alec N. Mutz, both of Rochester; Robert E. Zeman, Webster, all of N.Y.

[73] Assignee: Eastman Kodak Company, Rochester, N.Y.

[21] Appl. No.: 561,382

[22] Filed: Aug. 1, 1990

[51] Int. Cl.$^5$ .............................................. G03G 9/10
[52] U.S. Cl. .............................. 430/106.6; 430/108; 252/62.57
[58] Field of Search ..................... 430/106.6, 108; 252/62.57

[56] References Cited

U.S. PATENT DOCUMENTS 4,824,587 4/1989 Kwon et al. ............... 252/62.53
4,957,812 9/1990 Aoki et al. ................. 428/329

Primary Examiner—Marion E. McCamish
Assistant Examiner—S. Rasasco
Attorney, Agent, or Firm—Willard G. Montgomery

[57] ABSTRACT

Disclosed is an interdispersed two-phase ferrite composite which comprises about 0.1 mole to about 1.0 mole of a spinel phase having the general formula $MFe_2O_4$ where M is at least one element that forms a spinel ferrite and is selected from the group consisting of cobalt, manganese, iron and mixtures thereof, to about 2.5 moles of a magnetoplumbite phase having the general formula $PO.6Fe_2O_3$, where P is selected from the group consisting of stontium, barium, calcium, lead and mixtures thereof.

Also disclosed are carrier particles formed from magnetized particles of the composite which optionally can be polymerically coated, an electrostatic two-component dry developer composition comprising charged toner particles mixed with oppositely charged carrier particles formed from magnetized, and optionally polymerically coated, particles of the composite, and a method of developing an electrostastic image by contacting the image with a two-component dry developer composition described above.

19 Claims, No Drawings

INTERDISPERSED TWO-PHASE FERRITE COMPOSITE AND ELECTROGRAPHIC MAGNETIC CARRIER PARTICLES THEREFROM

FIELD OF THE INVENTION

This invention relates to hard ferrite magnetic carriers for use in electrostatographic copy machines. More particularly, it relates to an interdispersed two-phase ferrite composite where a first ferrite phase has a spinel structure and a second ferrite phase has a magnetoplumbite structure, for use in such carriers.

BACKGROUND OF THE INVENTION

In electrography, an electrostatic charge image is formed on a dielectric surface, typically the surface of a photoconductive recording element. Development of this image is commonly achieved by contacting it with a two-component developer comprising a mixture of pigmented resinous particles (known as "toner") and magnetically attractable particles (known as "carrier"). The carrier particles serve as sites against which the non-magnetic toner particles can impinge and thereby acquire a triboelectric charge opposite to that of the electrostatic image. During contact between the electrostatic image and the developer mixture, the toner particles are stripped from the carrier particles to which they had formerly adhered (via triboelectric forces) by the relatively strong electrostatic forces associated with the charge image. In this manner, the toner particles are deposited on the electrostatic image to render it visible.

It is known in the art to apply developer compositions of the above type to electrostatic images by means of a magnetic applicator which comprises a cylindrical sleeve of non-magnetic material having a magnetic core positioned within. The core usually comprises a plurality of parallel magnetic strips which are arranged around the core surface to present alternative north and south magnetic fields. These fields project radially, through the sleeve, and serve to attract the developer composition to the sleeve's outer surface to form a brushed nap. Either or both the cylindrical sleeve and the magnetic core are rotated with respect to each other to cause the developer to advance from a supply sump to a position in which it contacts the electrostatic image to be developed. After development, the toner-depleted carrier particles are returned to the sump for toner replenishment.

Conventionally, carrier particles made of soft magnetic materials have been employed to carry and deliver the toner particles to the electrostatic image. U.S. Pat. Nos. 4,546,060 to Miskinis et al, and 4,473,029 to Fritz et al, teach the use of hard magnetic materials as carrier particles and an apparatus for the development of electrostatic images utilizing such hard magnetic carrier particles, respectively. These patents require that the carrier particles comprise a hard magnetic material exhibiting a coercivity of at least 300 Oersteds when magnetically saturated and an induced magnetic moment of at least 20 EMU/gm when in an applied magnetic field of 1000 Oersteds. The terms "hard" and "soft" when referring to magnetic materials have the generally accepted meaning as indicated on page 18 of *Introduction to Magnetic Materials* by B. D. Cullity published by Addison-Wesley Publishing Company, 1972. These hard magnetic carrier materials represent a great advance over the use of soft magnetic carrier materials in that the speed of development is remarkably increased without experiencing deterioration of the image. Speeds as high as four times the maximum speed utilized in the use of soft magnetic carrier particles have been demonstrated.

The above two mentioned U.S. patents, while generic to all hard magnetic materials having the properties set forth, prefer the hard magnetic ferrites which are compounds of barium and/or strontium such as, $BaFe_{12}O_{19}$, $SrFe_{12}O_{19}$ and the magnetic ferrites having the formula $MO.6Fe_2O_3$, where M is barium, strontium or lead as disclosed in U.S. Pat. No. 3,716,630. While these hard ferrite carrier materials provide for a substantial increase in the speed with which development can be conducted in an electrostatographic apparatus, it is desired that even further improvements be made with respect to these hard ferrite carrier materials.

We have now discovered that the properties of the hard ferrite magnetic carrier particles described in aforementioned U.S. Pat. No. 4,546,060 and U.S. Pat. No. 4,473,029, both of which are fully incorporated herein by reference, can be improved by the addition of cobalt, manganese or iron to the particles. We have found that the addition of cobalt manganese or iron to the hard ferrite magnetic materials described in aforementioned U.S. Pat. Nos. 4,546,060 and 4,473,029 results in the formation of a two-phase composite structure which has a magnetic moment that is higher than the magnetic moment of the corresponding hard ferrite magnetic material by itself. This results in a higher rate of flow of developer compositions comprising mixtures of carrier particles prepared from the two-phase composite materials of the present invention and oppositely charged toner particles around the shell of a rotating-core magnetic applicator used to develop to electrostatic images of the type disclosed and described in previously mentioned U.S. Pat. Nos. 4,547,060 and 4,473,029. This in turn results in higher development speeds which means that more copies can be produced per unit time as discussed more fully in aforementioned U.S. Pat. No. 4,546,060.

In addition to facilitating the rapid flow of developer smoothly around the shell of the rotating-core magnetic applicator, the increase in magnetic moment provided by the two-phase composite materials of the present invention, results in an increased magnetic attraction between the rotating-core applicator and carrier particles formed from the material. This causes the carrier particles to be held more tightly or securely to the applicator shell during core rotation and development which prevents the carrier particles from transferring to and being picked-up by the recording element during development. The transfer of carrier particles from the applicator shell to the image being developed (i.e., "carrier pick-up") is to be avoided because carrier particles which are picked-up by the insulating surface in the toning operation have the effect at toner transfer of holding areas of the transfer surface away from the insulating surface thereby inhibiting toner powder transfer which causes image artifacts such as streaking and "tent-poling" in the transferred, developed and fixed images produced in the copying operation. The occurrence of carrier pick-up is commonly encountered when very small carrier particles, called "fines", are present in the developer composition. These particles, which typically have a particle size of approximately 10 micrometers or less, and more typically 0.1 to 5.0 micrometers, also have significantly lower or weaker magnetic moments, due to their smaller particle size, than those possessed by larger-sized carrier particles of the same or identical material (i.e., 10 micrometers or greater). "Particle size" as used herein refers to the "average diameters" of the particles. The average diameters of the particles herein are diameters of median particles by volume, i.e., 50 percent of the total volume of the particles is made up of particles that each have a diameter greater than the reported value and 50 percent of the total volume of the particles is made up of particles that each have a diameter less than the reported value. Thus, the ranges for the diameters of the particles in the total volume are reported herein. Because of their extremely small size and hence low magnetic moments, the magnetic attraction between the applicator shell and the small carrier particle fines is insufficient to hold the very small carrier particles on the applicator shell or sleeve during core-rotation and development with the result that the carrier particles tend to migrate readily and freely onto the recording element during development. We have found, however, that carrier pick-up can be ameliorated or reduced by as much as 80%, typically 75% to 80%, by utilizing developer compositions containing carrier particles prepared from the two-phase composite materials of the present invention in the development of electrostatic images in an electrostatographic development apparatus of the type disclosed are described in U.S. Pat. Nos. 4,564,060 and 4,473,029 as compared to the previously used hard ferrite magnetic carrier particles of the prior art-even in developer compositions containing carrier particle fines having diameters of 10 micrometers or less.

Of further significance, we have also found that magnetic carrier particles made from the two-phase composite materials of the present invention have a high coercivity, i.e., at least 300 Oersteds and, typically, about 1000 to 3000 Oersteds. A high coercivity is important as it results in better carrier flow, which means that the carrier particles flip 180° on the brush of the rotating-core applicator rather than sliding along the core of the brush which results in a higher charge on the toner and more delivery of the toner to the photoconductor as discussed more fully in U.S. Pat. No. 4,546,060.

SUMMARY OF THE INVENTION

Accordingly, there is now provided an interdispersed two-phase ferrite composite composition which comprises about 0.1 mole to about 1.0 mole of a spinel phase having the general formula $MFe_2O_4$ where M is at least one element that forms a spinel ferrite selected from the group consisting of cobalt, manganese, iron, and mixtures thereof, to about 2.5 moles of a magnetoplumbite phase having the general formula $PO.6Fe_2O_3$, where P is selected from the group consisting of strontium, barium, calcium, lead and mixtures thereof.

Also provided are carrier particles for use in the development of electrostatic images which comprise a hard magnetic interdispersed two-phase ferrite composite comprising from about 0.1 mole to about 1.0 mole of a spinel phase having the general formula $MFe_2O_4$ where M is at least one element that forms a spinel ferrite selected from the group consisting of cobalt, manganese, iron, and mixtures thereof, to about 2.5 moles of a magnetoplumbite phase having the general formula $PO.6Fe_2O_3$, where P is selected from the group consisting of strontium, barium, calcium, lead and mixtures thereof.

Further provided are two-component dry electrostatographic developers for use in the development of electrostatic images which comprise a mixture of charged toner particles and oppositely charged carrier particles comprising a hard magnetic interdispersed two-phase ferrite composite comprising from about 0.1 mole to about 1.0 mole of a spinel phase having the general formula $MFe_2O_4$, where M is at least one element that forms a spinel ferrite selected from the group consisting of cobalt, manganese, iron and mixtures thereof, to about 2.5 moles of a magnetoplumbite phase having the general formula $PO.6Fe_2O_3$, where P is selected from the group consisting of strontium, barium, calcium, lead and mixtures thereof.

Still further, there is provided a method of developing an electrostatic image on a surface which comprises contacting the image with a two-component dry electrostatographic developer composition which comprises a mixture of charged toner particles and oppositely charged carrier particles comprising a hard magnetic interdispersed two-phase ferrite composite comprising from about 0.1 mole to about 1.0 mole of a spinel phase having the general formula $MFe_2O_4$, where M is at least one element that forms a spinel ferrite selected from the group consisting of cobalt, manganese, iron and mixtures thereof, to about 2.5 moles of a magnetoplumbite phase having the general formula $PO.6Fe_2O_3$, where P is selected from the group consisting of strontium, barium, calcium, lead and mixtures thereof.

DETAILED DESCRIPTION OF THE INVENTION

The carrier particles of this invention comprise a homogeneous mixture of two separate phases. The first phase is a spinel or "S" phase which has a cubic crystal structure and can be represented by the general formula $MFe_2O_4$, where M is at least one element that forms a spinel ferrite and is selected from the group consisting of cobalt, manganese, iron and mixtures thereof. (When iron is used, the ferrite has the formula $Fe_3O_4$). The most preferred M element is cobalt.

The second phase is a magnetoplumbite phase or "M" phase which has a hexagonal crystal structure. The "M" phase has the general formula $PO.6Fe_2O_3$. In that formula, P is strontium, barium, calcium, lead or mixtures thereof. Of these four elements, calcium is the least preferred and strontium is the most preferred because it is less toxic and more commercially accepted. In the composite, about 0.1 mole to about 1.0 mole of the spinel phase is present for every 2.5 moles of the "M" phase.

The composites of this invention can be prepared by conventional procedures that are well known in the art of making ferrites. Suitable procedures are described, for example, in U.S. Pat. Nos. 3,716,630, 4,623,603, and 4,042,518; European Patent Application 0 086 445; "Spray Drying" by K. Masters, published by Leonard Hill Books London, pages 502-509 and "Ferromagnetic Materials," Volume 3 edited E. P. Wohlfarth, and published by North Holland Publishing Company, Amsterdam, N.Y., page 315 et seq. Briefly, a typical preparation procedure might consist of mixing oxides of the elements in the appropriate proportion with an organic binder and water and spray-drying the mixture to form a fine dry particulate. The particulate then can be fired between about 900° C. and 1300° C., which produces the ferrite composite. The composite is magnetized and is typically coated with a polymer, as is well known in the art, to better enable the carrier particles to triboelectrically charge the toner particles. The layer of resin on the carrier particles should be thin enough that the mass of particles remains conductive. Preferably the resin layer is discontinuous so that spots of bare ferrite on each particle provide conductive contact. The carrier particles can be passed through a sieve to obtain the desired range of sizes. A typical particle size, including the polymer coating, is about 5 to about 60 micrometers, but smaller sized carrier particles, about 5 to about 20 micrometers, are preferred as they produce a better quality image.

The composite ferrite carrier particles of this invention exhibit a high coercivity of at least 300 Oersteds, typically about 1000 to 3000 Oersteds, when magnetically saturated and an induced magnetic moment of at least 20 EMU/gm of carrier in an applied field of 1000 Oersteds. Preferred particles have an induced magnetic moment of about 30 to about 70 EMU/gm of carrier in an applied field of 1000 Oersteds. As mentioned previously, a high coercivity is desirable as it results in better carrier flow on the brush, which results in a higher charge on the toner and more delivery of the toner to the photoconductor, which in turn translates into higher development speeds.

The coercivity of a magnetic material refers to the minimum external magnetic force necessary to reduce the induced magnetic moment from the remanence value to zero while it is held stationary in the external field and after the material has been magnetically saturated, i.e., the material has been permanently magnetized. A variety of apparatus and methods for the measurement of coercivity of the present carrier particles can be employed, such as a Princeton Applied Research Model 155 Vibrating Sample Magnetometer, available from Princeton Applied Research Co., Princeton, N.J. The powder is mixed with a nonmagnetic polymer powder (90% magnetic powder: 10% polymer by weight). The mixture is placed in a capillary tube, heated above the melting point of the polymer, and then allowed to cool to room temperature. The filled capillary tube is then placed in the sample holder of the magnetometer and a magnetic hysteresis loop of external field (in Oersteds) versus induced magnetism (in EMU/gm) is plotted. During this measurement, the sample was exposed to an external field of 0 to 10,000 Oersteds.

The induced moment of composite carriers in a 1000 Oersted applied field is dependent on the composition and concentration of the magnetic material in the particle. The present invention contemplates the fact that by incorporating a spinel ferrite phase consisting of $CoFe_2O_4$, $MnFe_2O_4$, $Fe_3O_4$ or mixtures thereof, into a hard magnetic ferrite composition of the prior art consisting of $SrFe_{12}O_{19}$, $BaFe_{12}O_{19}$, $CaFe_{12}O_{19}$, $PbFe_{12}O_{19}$ or mixtures thereof, that the net magnetic moment of the resultant interdispersed two-phase ferrite composite will be increased over the magnetic moment of the hard magnetic ferrite composition by itself due to the additive effect of the magnetic moment value of the spinel ferrite phase to that of the magnetoplumbite phase. For example, we have found that the magnetic moment of a composite carrier particle of the invention comprising a spinel or "S" phase of $CoFe_2O_4$ and a magnetoplumbite or "M" phase of $SrFe_{12}O_{19}$ in a mole ratio of 0.6:2.5 was 62.4 EMU/gm of carrier particle as compared to a magnetic moment of 55.5 EMU/gm of carrier particle for the "M" phase alone.

We have found, however, that it is important that the molar ratio of the spinel or "S" phase ($MFe_2O_4$) to the magnetoplumbite or "M" phase ($PO.6Fe_2O_3$) be closely maintained at approximately 0.1 mole to 1 mole of the spinel phase to approximately 2.5 moles of the magnetoplumbite phase since an excess of spinel phase in the composite carrier particles, while increasing the magnetic moment of the composite particles, also tends to reduce the coercivity of the composite particles significantly down to a maximum of as low as about 600 Oersteds. This results in poor carrier flow on the magnetic brush. Conversely, if the concentration of the spinel phase present in the composite carrier particle falls much below the aforestated amounts, a reduction in the saturation magnetic moment of the particles results. This in turn results in a reduction in the rate of carrier flow over the applicator shell and unacceptably high carrier pick-up.

The novel developers of present invention comprise two alternative types of carrier particles. The first of these carriers comprises a binder-free magnetic particulate material exhibiting the requisite coercivity and induced magnetic moment. This type is preferred.

In the second developer, each carrier particle is heterogeneous and comprises a composite of a binder and a magnetic material exhibiting the requisite coercivity and induced magnetic moment. The magnetic material is dispersed as discrete smaller particles throughout the binder; that is, each composite carrier particle comprises a discontinuous particulate magnetic material phase of the requisite coercivity in a continuous binder phase.

The individual bits of the magnetic material should preferably be of a relatively uniform size and sufficiently smaller in diameter than the composite carrier particle to be produced. Typically, the average diameter of the magnetic material should be no more than about 20 percent of the average diameter of the carrier particle. Advantageously, a much lower ratio of average diameter of magnetic component to carrier can be used. Excellent results are obtained with magnetic powders of the order of 5 micrometers down to 0.05 micrometer average diameter. Even finer powders can be used when the degree of subdivision does not produce unwanted modifications in the magnetic properties and the amount and character of the selected binder produce satisfactory strength, together with other desirable mechanical and electrical properties in the resulting carrier particle.

The concentration of the magnetic material can vary widely. Proportions of finely divided magnetic material, from about 20 percent by weight to about 90 percent by weight of composite carrier, can be used.

As mentioned previously, the induced magnetic moment of composite carriers in a 1000 Oersted applied field is dependent on the composition and concentration of the magnetic material in the particle. It will be appreciated, therefore, that the induced moment of the magnetic material should be sufficiently greater than 20 EMU/gm to compensate for the effect upon such induced moment from dilution of the magnetic material in the binder. For example, one might find that, for a concentration of 50 weight percent magnetic material in the composite particles, the 1000 Oersted induced magnetic moment of the magnetic material should be at least 40 EMU/gm to achieve the minimum level of 20 EMU/gm for the composite particles.

The binder material used with the finely divided magnetic material is selected to provide the required mechanical and electrical properties. It should (1) adhere well to the magnetic material, (2) facilitate the formation of strong, smooth-surfaced particles and (3) preferably possess sufficient difference in triboelectric properties from the toner particles with which it will be used to insure the proper polarity and magnitude of electrostatic charge between the toner and carrier when the two are mixed.

The matrix can be organic, or inorganic, such as a matrix composed of glass, metal, silicone resin or the like. Preferably, an organic material is used such as a natural or synthetic polymeric resin or a mixture of such resins having appropriate mechanical properties. Appropriate monomers (which can be used to prepare resins for this use) include, for example, vinyl monomers such as alkyl acrylates, and methacrylates, styrene and substituted styrenes, basic monomers such as vinyl pyridines, etc. Copolymers prepared with these and other vinyl monomers such as acidic monomers, e.g., acrylic or methacrylic acid, can be used. Such copolymers can advantageously contain small amounts of polyfunctional monomers such as divinylbenzene, glycol dimethylacrylate, triallyl citrate and the like. Condensation polymers such as polyesters, polyamides or polycarbonates also can be employed.

Preparation of composite carrier particles according to this invention may involve the application of heat to soften thermoplastic material or to harden thermosetting material; evaporative drying to remove liquid vehicle; the use of pressure, or of heat and pressure, in molding, casting, extruding, etc., and in cutting or shearing to shape the carrier particles; grinding, e.g., in ball mill to reduce carrier material to appropriate particle size; and sifting operations to classify the particles.

According to one preparation technique, the powdered magnetic material is dispersed in a solution of the binder resin. The solvent may then be evaporated and the resulting solid mass subdivided by grinding and screening to produce carrier particles of appropriate size.

According to another technique, emulsion or suspension polymerization is used to produce uniform carrier particles of excellent smoothness and useful life.

As discussed previously, carrier particles of the invention are employed in combination with toner particles to form a dry, two-component composition. In use, the toner particles are electrostatically attracted to the electrostatic charge pattern on an element while the carrier particles remain on the applicator shell. This is accomplished in part by intermixing the toner and carrier particles so that the carrier particles acquire a charge of one polarity and the toner particles acquire a charge of the opposite polarity. The charge polarity on the carrier is such that it will not be electrically attracted to the electrostatic charge pattern. The carrier particles are also prevented from depositing on the electrostatic charge pattern because the magnetic attraction exerted between the rotating core and the carrier particles exceeds the electrostatic attraction, which may arise between the carrier particles and the charge image.

Tribocharging of toner and "hard" magnetic carrier is achieved by selecting materials that are so positioned in the triboelectric series to give the desired polarity and magnitude of charge when the toner and carrier particles intermix. If the carrier particles do not charge as desired with the toner employed, moreover, the carrier can be coated with a material which does. Such coating can be applied to either composite or binder-free particles as described herein. The polarity of the toner charge, moreover, can be either positive or negative.

Various resin materials can be employed as a coating on the "hard" magnetic carrier particles. Examples include those described in U.S. Pat. Nos. 3,795,617, to J. McCabe; 3,795,618, to G. Kasper and 4,076,857 to G. Kasper. The choice of resin will depend upon its triboelectric relationship with the intended toner. For use with toners which are desired to be positively charged, preferred resins for the carrier coating include fluorocarbon polymers such as poly(tetrafluoroethylene); poly(vinylidene fluoride) and poly(vinylidene fluoride-co-tetrafluoroethylene).

The carrier particles can be coated with a tribocharging resin by a variety of techniques such as solvent coating, spray application, plating, tumbling or melt coating. In melt coating, a dry mixture of "hard" magnetic particles with a small amount of powdered resin, e.g., 0.05 to 5.0 weight percent resin is formed, and the mixture heated to fuse the resin. Such a low concentration of resin will form a thin or discontinuous layer of resin on the carrier particles.

The developer is formed by mixing the particles with toner particles in a suitable concentration. Within developers of the invention, high concentrations of toner can be employed. Accordingly, the present developer preferably contains from about 70 to 99 weight percent carrier and about 30 to 1 weight percent toner based on the total weight of the developer; most preferably, such concentration is from about 75 to 99 weight percent carrier and from about 25 to 1 weight percent toner.

The toner component of the invention can be a powdered resin which is optionally colored. It normally is prepared by compounding a resin with a colorant, i.e., a dye or pigment, and any other desired addenda. If a developed image of low opacity is desired, no colorant need be added. Normally, however, a colorant is included and it can, in principle be any of the materials mentioned in Colour Index, Vols. I and II, 2nd Edition. Carbon black is especially useful. The amount of colorant can vary over a wide range, e.g., from 3 to 20 weight percent of the polymer. Combinations of colorants may be used.

The mixture is heated and milled to disperse the colorant and other addenda in the resin. The mass is cooled, crushed into lumps and finely ground. The resulting toner particles range in diameter from 0.5 to 25 micrometers with an average size of 1 to 16 micrometers. Preferably, the average particle size ratio of carrier to toner lies within the range from about 15:1 to about 1:1. However, carrier-to-toner average particle size ratios of as high as 50:1 are also useful.

The toner resin can be selected from a wide variety of materials, including both natural and synthetic resins and modified natural resin, as disclosed, for example, in the patent to Kasper et al, U.S. Pat. No. 4,076,857. Especially useful are the crosslinked polymers disclosed in the patent to Jadwin et al, U.S. Pat. No. 3,938,992, and the patent to Sadamatsu et al, U.S. Pat. No. 3,941,898. The crosslinked or non-crosslinked copolymers of styrene or lower alkyl styrenes with acrylic monomers such as alkyl acrylates or methacrylates are particularly useful. Also useful are condensation polymers such as polyesters.

The shape of the toner can be irregular, as in the case of ground toners, or spherical. Spherical particles are obtained by spray-drying a solution of the toner resin in a solvent. Alternatively, spherical particles can be prepared by the polymer bead swelling techniques disclosed in European Patent No. 3,905, published Sept. 5, 1979, to J. Ugelstad.

The toner also can contain minor components such as charge control agents and antiblocking agents. Especially useful charge control agents are disclosed in U.S. Pat. No. 3,893,935 and British Pat. No. 1,501,065. Quaternary ammonium salt charge agents as disclosed in Research Disclosure, No. 21030, Volume 210, Oct., 1981 (published by Industrial Opportunities Ltd., Homewell, Havant, Hampshire, PO9 1EF, United Kingdom), also are useful.

In the method of the present invention, an electrostatic image is brought into contact with a magnetic brush comprising a rotating-magnetic core, an outer non-magnetic shell and the two-component, dry developer described above. The electrostatic image so developed can be formed by a number of methods such as by imagewise photodecay of a photoreceptor, or imagewise application of a charge pattern on the surface of a dielectric recording element. When photoreceptor are employed, such as in high-speed electrophotographic copy devices, the use of halftone screening to modify an electrostatic image can be employed, the combination of screening with development in accordance with the method for the present invention producing high-quality images exhibiting high $D_{max}$ and excellent tonal range. Representative screening methods including those employing photoreceptors with integral half-tone screens are disclosed in U.S. Pat. No. 4,385,823.

The invention is further illustrated by the following examples.

EXAMPLE 1

Powders of strontium carbonate, iron oxide and cobalt oxide was weighed and mixed thoroughly. In a separate container, a stock solution was prepared by dissolving 4 weight percent (based on stock solution weight) of a binder resin and 0.4 weight percent ammonium polymethacrylate surfactant (sold by W. R. Grace and Co. as "Daxad-32") in distilled water. The powders were mixed with the stock solution in a 50:50 weight ratio and the mixture was ball milled for about 24 hours then spray dried. The green bead particles thus formed were classified to obtain a suitable particle size distribution. The green bead was then fired at a temperature between 900° and 1300° C. for 15 to 20 hours. The fired cake, thus obtained, was deagglomerated and the powder was sieved to be used as carrier. The resulting carriers had a two-phase composite structure with a spinel phase consisting of $CoFe_2O_4$ and an "M" phase consisting of $SrFe_{12}O_{19}$. The mole ratio of the "M" phase was kept constant at 2.5 with the "S" phase being 0.4, 0.6 or 1.0 mole. (A higher ratio of the "S" phase can be obtained utilizing the same procedure along with a variable mole ratio, other than 2.5, of the "M" phase).

The samples were subjected to a vibrating sample magnetometer test along with a control carrier core consisting only of the "M" phase. The results of the test are shown in Table 1.

TABLE 1

| Spinel Phase | Moles per 2.5 moles "M" phase | Magnetization (EMU/g) | Coercivity (Oersteds) |
|---|---|---|---|
| Control | 0 | 55.5 | 2125 |
| $CoFe_2O_4$ | 0.4 | 60.4 | 2205 |
| $CoFe_2O_4$ | 0.6 | 62.4 | 1610 |
| $CoFe_2O_4$ | 1.0 | 69.8 | 1373 |

The above table shows that the magnetization (i.e., the magnetic moment) was increased significantly as the concentration of the spinel phase increased and that the coercivity of the two-phase "M" and "S" composite structures are high and comparable to those of the control.

X-ray diffraction analysis showed that the ferrites have an interdispersed two-phase composite structure consisting of a spinel or "S" phase having a cubic crystal structure and a magnetoplumbite or "M" phase having a hexagonal crystal structure.

EXAMPLE 2

Developer compositions of the present invention were evaluated for carrier pick-up according to the following procedure.

A delveloper composition was prepared consisting of a mixture of 9.2 grams of carrier particles prepared as described in Example 1 above and comprising a two-phase interdispersed composite of a spinel phase of $CoFe_2O_4$ and a magnetoplumbite phase of $SrFe_{12}O_{19}$ in a mole ratio of 1.0 mole of the spinel phase to 2.5 moles of the magnetoplumbite phase and 0.8 gram of toner particles comprising a cyan pigmented amorphous polyester resin. The coercivity of the carrier particles was 1646 Oersteds when magnetically saturated as measured herein and the particles exhibited an induced magnetic moment of 66 EMU/gm when in an applied field of 1000 Oersteds as measured herein. The carrier particles were coated with 0.5 pph Kynar 301 fluorocarbon polymer (Pennwalt Chemical Company, King of Prussia, Pa.) which enabled the carrier to charge the toner positively. The toner particles had a volume average diameter of 2.5 micrometers. The toner charge ranged from 195 to 250 microcoulombs per gram of toner. The charge on the toner, Q/M, in microcoulombs/g, was measured using a standard procedure in which the toner and carrier are placed on a horizontal electrode beneath a second horizontal electrode and are subjected to both an AC magnetic field and a DC electric field. When the toner jumps to the other electrode, the change in the electrical charge is measured and is divided by the weight of the toner that jumped. A control developer also was prepared for comparison consisting of 9.2 grams of carrier particles consisting only of the magnetoplumbite phase (i.e., $SrFe_{12}O_{19}$) described above and 0.8 gram of the toner powder described above. The respective developer compositions were tested for their carrier pick-up tendencies as follows.

After shaking in separate glass vials for two minutes the developer compositions prepared as described above were applied to an electrostatic image containing multiactive organic photoconductive element using a rotating-core magnetic applicator housed on a linear breadboard. The magnetic applicator included a 5.08 cm outside diameter, non-magnetic stainless steel shell 15.24 cm in axial length. A core containing ten alternating pole magnets was enclosed in the shell which produced a magnetic field of 900-1000 Oersteds on the shell surface. The tests were made while rotating the core of magnets at 1000 revolutions per minute in a direction counter to the direction in which the photoconductive element moved. The shell of the applicator was rotated at 15 revolutions per minute. Developer was distributed on the shell from a feed hopper and traveled clockwise around the shell. A trim skive was set to allow a nap thickness of 5-40 mils.

The photoconductive element employed was, as previously discussed, an organic multiactive photoconductive film. The film was a negatively charged reusable film. Electrostatic images were formed thereon by uniformly charging the element to $-500$ volts and exposing the charged element to an original. The resulting charge image ranged from $-100$ volts to $-200$ volts and was developed by passing the element over the magnetic brush at a speed of 5.0 cm/sec in the direction of developer flow. The brush was electrically biased to 360 volts.

After development, the toner image was electrostatically transferred to a paper receiver and thereon fixed by roller fusion at a temperature of approximately 106° C. A small area (2.0 mm ×5.0 mm) of the developed and fixed image was optically scanned using a 98× microscope and the number of carrier particles present in the area under observation were counted to give the number of particles present in the 10 square millimeter area. Since carrier pick-up results in the formation of dark specs on the image, it is relatively easy to distinguish the carrier particles deposited on the image from the toner particles on the image. The results showed that in the area observed on the fixed image which had been developed with the developer composition containing carrier particles made from the two-phase composite ferrite material of the present invention, there were only 2 carrier particles present in the area observed whereas in the corresponding area of a fixed image developed with the developer composition containing carrier particles made from $SrFe_{12}O_{19}$ only, 10 carrier particles were deposited in the area indicating an 80% reduction in carrier pick-up utilizing developer compositions containing carrier particles of the present invention.

"Electrography" and "electrographic" as used herein are broad terms which include image-forming processes involving the development of an electrostatic charge pattern formed on a surface with or without light exposure, and thus include electrophotography and other processes.

The invention has been described in detail with particular reference to preferred embodiments thereof, but it will be understood that variations and modifications can be effected within the spirit and scope of the invention.

We claim:

1. An interdispersed two-phase ferrite composite which comprises about 0.1 mole to about 1.0 mole of a spinel phase having the general formula $MFe_2O_4$ where M is at least one element that forms a spinel ferrite selected from the group consisting of cobalt, manganese, iron and mixtures thereof, to about 2.5 moles of a magnetoplumbite phase having the general formula $PO.6Fe_2O_3$, where P is selected from group consisting of strontium, barium, calcium, lead and mixtures thereof.

2. A composite according to claim 1, wherein M is cobalt.

3. A composite according to claim 1, wherein M is manganese.

4. A composite according to claim 1, wherein M is iron.

5. A composite according to claim 1, wherein P is strontium.

6. A particle formed of a composite according to claim 1.

7. A particle according to claim 6, which is generally spherical.

8. A carrier for use in the development of electrostatic images comprising magnetized particles according to claim 6.

9. A carrier for use in the development of electrostatic images comprising particles according to claim 6, magnetized and coated with a polymer.

10. A carrier for use in the development of electrostatic images according to claim 9, having a particle size of about 5 to about 60 micrometers in diameter.

11. A carrier for use in the development of electrostatic images according to claim 10, having a particle size of about 5 to about 20 micrometers in diameter.

12. Carrier particles for use in the development of electrostatic images which comprise a hard magnetic interdispersed two-phase ferrite composite comprising from about 0.1 mole to about 1.0 mole of a spinel phase having the general formula $MFe_2O_4$ where M is at least one element that forms a spinel ferrite selected from the group consisting of cobalt, manganese, iron and mixtures thereof, to about 2.5 moles of a magnetoplumbite phase having the general formula $PO.6Fe_2O_3$, where P is selected from the group consisting of strontium, barium, calcium, lead and mixtures thereof.

13. The carrier particles of claim 12 exhibiting a coercivity of at least 300 Oersteds when magnetically saturated and an induced magnetic moment of at least 20 EMU/gm of carrier in an applied field of 1000 Oersteds.

14. A developer comprising about 75 to about 99 weight percent of a carrier according to claim 8, and about 1 to about 25 weight percent of a toner.

15. An electrostatic two-component dry developer composition for use in the development of electrostatic images which comprises a mixture of charged toner particles and oppositely charge carrier particles which comprise a hard magnetic interdisposed two-phase ferrite composite comprising from about 0.1 mole to about 1.0 mole of a spinel phase having the general formula $MFe_2O_4$, where M is at least one element that forms a spinel ferrite selected from the group consisting of cobalt, manganese, iron and mixtures thereof, to about 2.5 moles of a magnetoplumbite phase having the general formula $PO.6Fe_2O_3$, where P is selected from the group consisting of strontium, barium, calcium, lead and mixtures thereof.

16. The composition according to claim 15, wherein the carrier particles exhibit a coercivity of at least 300 Oersteds when magnetically saturated and an induced magnetic moment of at least 20 EMU/gm of carrier in an applied field of 1000 Oersteds.

17. A method of developing an electrostatic image comprising contacting the image with a two-component dry developer composition of claim 14.

18. A method of developing an electrostatic image comprising contacting the image with a two-component dry developer composition of claim 15.

19. A method of developing an electrostatic image comprising contacting the image with a two-component dry developer composition of claim 16.

* * * * *